United States Patent Office 3,229,604
Patented Jan. 18, 1966

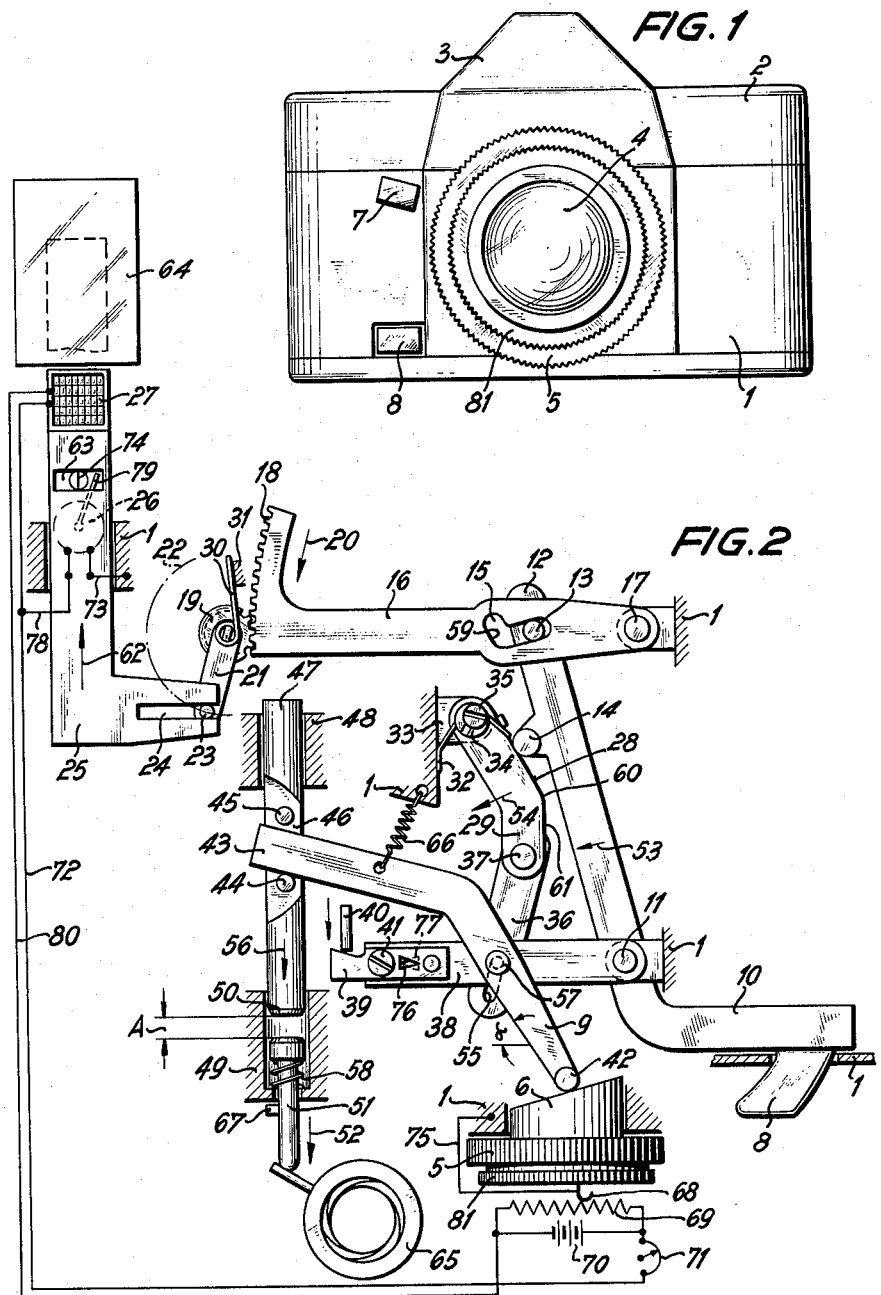

3,229,604
SINGLE LENS REFLEX CAMERA WITH EXPOSURE METER HAVING PHOTOSENSITIVE CELL MOVABLE INTO FIELD OF VIEWFINDER
Walter Swarofsky and Fritz Renneberg, Braunschweig, Germany, assignors to Voitlander A.G., Braunschweig, Germany, a corporation of Germany
Filed Jan. 19, 1962, Ser. No. 167,383
Claims priority, application Germany, Jan. 30, 1961, V 20,067
15 Claims. (Cl. 95—10)

This invention relates to single lens reflex cameras equipped with exposure meters whose photosensitive cells are arranged to have incident thereupon the light rays entering through the objective lens during viewfinding. More particularly, the present invention is directed to a single lens reflex camera of this type wherein, during viewfinding, the photosensivtive cell of the exposure meter is positioned in the field of view of the viewfinder to have incident thereupon light rays entering such field of view, and in which the total luminous flux incident upon the photocell is determined by the diaphragm aperture setting.

When sighting a single lens reflex camera, it is desirable, for best results, that the diaphragm aperture be fully opened in order to obtain the brightest possible finder image. However, for determining the proper light values for exposure, means must be provided whereby the luminous flux incident on the photosensitive cell of the exposure meter is coordinated with the setting of the diaphragm is accordance with the ambient illumination of the object or scene to be photographed, and which setting should correspond to the shutter setting.

In accordance with the present invention, these objectives are obtained in the simplest possible manner by providing mechanical means, manually operated, for moving at least the photosensitive cell, and preferably also the indicator of the measuring instrument of the exposure meter, into the field of view of the viewfinder during a viewfinding operation preparatory to make an exposure. The mechanical operating means includes a special adjustment whereby the diaphragm may be adjusted to a given or selected value while the photosensitive cell is positioned in the path of light rays entering through the objective lens of the camera.

It is more important that the setting of the diaphragm should be effected before the photosensitive cell is positioned in the path of light rays entering through the camera objective, and that the diaphragm be further adjustable to a value corresponding to the reading of the exposure meter while the mechanical operating means is manually actuated and with the photosensitive cell positioned in the path of light rays entering through the camera objective. It is further preferable that the shutter release be so coupled with the mechanical operating means used in positioning the photosensitive cell in the path of light rays entering through the objective and in effecting a setting of the diaphragm that, when the mechanical operating means is released and the shutter is triggered, the diaphragm is reset from a fully open position to a preselected value or to a value determined by the reading of the exposure meter. In this connection, the diaphragm is normally biased to the fully opened position except when the operating means for positioning the photosensitive cell is manually actuated or when the shutter is triggered.

For an understanding of the principles of the invention, reference is made to the following description of typical embodiments thereof, one of which is illustrated in the accompanying drawings. In the drawings:

FIG. 1 is a front elevational view of a single lens reflex camera embodying the invention; and FIG. 2 is a schematic illustration of the mechanical operating means embodying the invention, in association with parts of the camera shown in FIG. 1.

Referring to FIG. 1, a single lens reflex camera is illustrated as comprising a housing 1, a camera cover or hood 2, and a viewfinder mount 3. The mount 3 preferably includes a prism and serves as means for viewing the image projected by the usual mirror of a single lens reflex camera onto the viewfinder screen. The camera includes an objective lens 4 on which is rotatably mounted a diaphragm preselector ring 5 carrying a cam 6 (FIG. 2) cooperable with the mechanical operating means of the invention. As also seen in FIG. 1, the camera is provided with a shutter release key 7 as well as with a manually operable key 8 by means of which the mechanical operating means, including a setting lever 9 (FIG. 2), may be actuated to move the photosensitive cell of the exposure meter into the path of light rays entering through the objective lens 4.

Referring to the schematic illustration of FIG. 2, key 8 is rigidly mounted on, or integral with, a bell crank lever 10 which is pivoted a fixed point 11 in housing 1. Adjacent the free end 12 of lever 10, there is a pin 13 and, somewhat inwardly from pin 13, there is a second pin 14. Pins 13 and 14 extend perpendicularly to the general plane of movement of lever 10. Pin 13 projects through an angular slot 15 in a lever 16 pivoted at a fixed point 17 on housing 1 and having its free end formed as, or carrying, a gear segment 18 meshing with a pinion 19. When, during operation of the invention arrangement, the lever 16 is swung about its fixed pivot 17 at one end thereof, the gear segment 18 moves in the direction indicated by the arrow 20.

Such motion of the gear segment 18, through the pinion 19, causes a radius arm 21, fixed with the pinion 19, to swing through a circular path indicated by the dot and dash line 22. The outer end of radius arm 21 has a pin 23 projecting perpendicularly therefrom with respect to the plane of rotation of the arm 21 and extending into a slot 24 of a slide 25 on which is mounted the moving coil instrument 26 of the exposure meter together with the photosensitive cell 27 thereof.

By operation of the slide 25, the photosensitive cell 27, which is preferably a photoelectric cell, may be moved in the direction indicated by the arrow 62 so as to be positioned with its light sensitive surface facing the viewing screen 64 of the viewfinder. Thereby, the cell 27 is in the path of light rays entering through objective lens 4 and reflected, by the usual mirror provided in single lens reflex cameras, to the viewfinder screen 64. The indicator 79 of instrument 26 can also be viewed in the field of view of the viewfinder, together with its associated zero mark 74 or a scale or the like. A return spring 30, having one end engaging a stop 31 integral with or fixed to housing 1, biases the radius arm 21 and, through the pinion 19 and the gear segment 18, the lever 16 to the position illustrated in FIG. 2.

Pin 14 engages the edge 28 of a bent link 29 forming part of an expansible coupling somewhat similar to a toggle joint. The link 29 is pivoted at a point 33 fixed with respect to housing 1, and a return spring 32 continously biases the link 29 into engagement with the pin 14. The relative position of link 29 with respect to its pivotal point is adjustable by means of an eccentric 34 and a setscrew 35.

A second link 36, also forming part of the aforementioned expansible coupling, is pivotally connected to the link 29 by a bolt or pin 37. The free end of link 36 is rotatably and longitudinally displaceably coupled to the setting lever 9 by virtue of a longitudinally extending slot 55 near the free end of link 36 and which slidably and pivotally receives a pin 57, secured in a coupling lever 38 and forming a pivot for lever 9 about the coupling lever 38. One end of coupling lever 38 is pivoted at the point 11. The opposite or free end of the coupling lever 38 adjustably mounts a stop or abutment element 39 engageable by a push-rod 40 connected with the shutter release and the hinging mechanism for the mirror. Element 39 may be adjustable with the aid of two triangular adjusting apertures 76 and 77, respectively formed in the element 39 and in the coupling lever 38, and by means of a setscrew 41.

The setting lever 9 is a bent lever, and one end thereof carries a cam follower 42 which may be in the form of a roller, a guide shoe or the like, and which engages the cam 6 coupled to the preselector ring 5 for the diaphragm 65. The opposite end 43 of lever 9 extends between a pair of pins 44 and 45 seated in a rabbet 46 of a longitudinally displaceable diaphragm adjusting pin 47. Pin 47 is longitudinally slidably mounted in bearings 48 and 49 in the housing 1. An end 50 of pin 47 is arranged to engage a push-rod or tappet 51 after a predetermined travel along a displacement path A. In a known manner, the tappet 51 is arranged to set the diaphragm 65. The further the diaphragm pin 47 or the tappet 51 moves in the direction of the arrow 52, the more complete is the closure of the diaphragm aperture. In other words, movement of pin 47 toward tappet 51 and, after engagement of these parts, movement of tappet 57 against the force of a biasing coil spring 58, moves the diaphragm 65 in an aperture closing direction. The spring 58 biases the tappet 51 to the position shown in FIG. 2, and a return spring 66 connected between lever 9 and housing 1 biases steering pin 47 to the position shown in the drawing, due to the interaction between end 43 of lever 9 and the pins 44 and 45. A stop pin 67 limits movement of the tappet 51 under the influence of the spring 58.

A sliding contact 68 can be mechanically connected to a shutter time setting ring 81, and is grounded to the camera housing 1 by a lead 75. Slider 68 is movable along a resistance 69 serving as a voltage divider and having a source of potential 70 connected in parallel therewith. The resistance 69, thus acting as a voltage divider, can be connected into a familiar type of Wheatstone bridge circuit together with an adjusting resistance 71, this connection being effected by conductors 72, 78 and 80 so that the bridge circuit includes the moving coil instrument 26 and the photoelectric cell 27 which, in the illustrated example, is designed as a photoresistance cell. Also, in the illustrated example, the moving coil instrument 26 is designed as a balancing instrument and is connected to ground by a conductor 73.

The described arrangement operates in the following manner. The initial position of the parts as shown in FIG. 2 is determined by the particular setting or ring 5 which in turn determines the position of cam 6 engaged by the follower 42 on setting lever 9. When key 8 is pressed into the housing 1, bell crank lever 10 is rotated counterclockwise as indicated by the arrow 53, this rotation occurring about the pivot point 11. As a result of this rotation, pin 13 slides along the angular slot 15 of lever 16 but, at least during its initial movement, without appreciably moving lever 16. Pin 14, engaged with edge surface 28 of lever 29, simultaneously rotates lever 29 clockwise in the direction indicated by the arrow 54. During this movement of lever 29, pin 14 moves along the surface 28 toward the apex 60. Pin 37 moves with the lever 29 and is thus displaced to the left as viewed in FIG. 2. This causes an increase in the effective distance between the fixed pivot point 33 and the movable pivot bolt 57, thus causing lever 38 to be swung counterclockwise. As lever 38 is swung counterclockwise, the setting lever 9 is likewise pivoted counterclockwise about its follower 42 engaging the cam 6. As a result, the end 43 of setting lever 9 comes into firm engagement with the pin 44 on the diaphragm steering pin 47 and moves pin 47 toward the tappet 51, as indicated by the arrow 56.

The spring 58 engaging the tappet 51 moves this tappet upwardly to the limit permitted by the stop 67, and thereby the diaphragm 65, which is spring biased in a direction to maintain contact with the tappet 51, will always be initially opened. Similarly, the spring 66 engaging the setting lever 9, and which could be engaged with the pin 47, always biases the lever 9 and the pin 47 to its initial position shown in FIG. 2. The distance A between the ends 50 of the pin 47 and the head of the tappet 51 varies with the degree of opening of the diaphragm 65 preselected by the preselector ring 5. That is, it varies with an increase in the value of the angle α between the setting lever 9 and a horizontal line in FIG. 2. For the lowest value of diaphragm opening, the end 50 of the pin 47 may closely approach the head of the tappet or push-rod 51.

The lost motion travel of the pin 47 in advance of the initiation of closing movement of the diaphragm, as represented by the gap A, may also be effected in such a manner that the tappet 51 will always engage the end 50 of the pin 47 so that the spring 58 will not only move the tappet 51 to its initial position but also will move the pin 47 to its initial position. With such an arrangement, the lost motion of the pin 47 and the tappet 51 before the diaphragm starts to close would still correspond to the distance A. Consequently, it is possible to effect a setting of the diaphragm by means of operating the cam 6 through the preselector ring 5 only when key 8 is depressed, and correspondingly to preselect, in each instance, the diaphragm value at which, with key 8 depressed, the diaphragm will close.

If the photosensitive cell of the exposure meter were exposed to the light rays entering through the objective lens 4 before the key 8 was fully depressed, this would result in a false reading of the exposure meter. Consequently, means are provided whereby the cell 27 is moved into the light ray path only after the pin 47 has reached its limit of movement under the influence of depression of the key 8. Furthermore, once the diaphragm 65 has been thus set, it is important to prevent any further adjustment thereof by further depression of key 8 with resultant swinging movement of the bell crank lever 10.

These effects are attained by the fact that there is initially only a very slight movement of the lever 16 as a result of swinging of the bell crank lever 10, due to the fact that the pin 13 is sliding nearly longitudinally of lever 16 in the angular slot 15. As the pin 13 reaches the edge 59 of the slot 15, at the bend in the slot, pivoting movement of lever 16 in a counterclockwise direction is effected. At the same time, pin 14, sliding along the surface 28, reaches the apex 60 on the curved or angled bearing surface of the link or lever 29 and continues to slide along the surface 61. Under these conditions, the expansible coupling including the levers 29 and 36, effective upon the setting lever 9, does not expand any further even though the swinging movement of the bell crank lever 10 is continued. It should be noted that the effective pivot points 33 and 37 may be so selected that a surface having an apex 60 may be dispensed with, and the resultant desired operation still be attained.

However, as the bell crank lever 10 continues to swing counterclockwise with further depression of the key 8, lever 16 is swung counterclockwise due to the pin 13 bearing against the edge 59 of the slot 15, the swinging of lever 16 being in the direction indicated by the arrow 20. Due to rotation of the pinion 19 by the gear segment 18, the slide 29 carrying the moving coil instrument 26 and the photoelectric cell 27 is moved toward the viewfinder screen 64, as indicated by the arrow 62. At the limit of movement of key 8 inwardly, the photocell 27 and the indicator 79 of the instrument 26 are positioned in the field of view of one looking at the viewfinder screen 64 so that the light rays entering through the objective 4 and reflected by the usual hinge mirror to the viewfinder screen 64, during a viewfinding operation, impinge upon the photosensitive cell 27 to make the exposure meter operative to provide a reading.

Thus, with the invention arrangement the pin 47 will always reach a position determined by the setting of the cam 6, corresponding to a given position of the diaphragm, before the instrument 26 and the photocell 27 are moved into the path of the light rays. During such movement of the instrument 26 and the cell 27 mounted on the slide 25, pin 47 remains stationary due to the shape imparted to the edges 28 and 61 of the lever 29. The setting of the diaphragm effected by the previous movement of pin 47 remains thus unchanged during the remaining stroke of the key 8, whereby an exposure reading is possible, in any instance, only after the diaphragm 65 has been adjusted to its preselected set value.

When key 8 is released, pin 47, tappet 51, and diaphragm 65 are restored by the associated return springs to the initial position so that the diaphragm is again fully open. From this fully open position, diaphragm 65 must be reset again to the preselected setting in advance of release of the shutter.

For this purpose, the shutter release is coupled with the tappet 40 acting on the end of the lever 38 and thereby operative upon the setting lever 9 through its pivot bolt 57 to an extent such that, when tappet or plunger 40 is depressed, the lever 9 is operated to move the pin 47 and the tappet 51 to a position again setting the diaphragm 65 at the position determined by the particular setting of ring 5 and thus of the particular angular orientation of the cam 6. During this operation, the pin or bolt 57 slides in the slot 55 in the link or lever 36 for unrestricted movement of the setting lever 9.

As stated, FIG. 2 shows a known type of bridge circuit involving a balancing instrument and a photoresistance cell and which is applicable as one means of effecting the objects of the present invention. With the illustrated arrangement, setting of diaphragm 65 in accordance with the ambient light values of the object or person to be photographed can be effected by adjusting diaphragm presetting ring 5, with the key 8 held depressed, until indicator 79 of instrument 26 is aligned with zero mark 74. When the shutter is released, diaphragm 65 is again reset to the setting corresponding to the value preselected in this matter.

It will be apparent to those skilled in the art that it is possible to couple sliding contact 68 operating on the voltage divider resistance 69 either with timing ring 81 or with a setting device for film sensitivity. This makes it possible to preselect the shutter time with allowances for the film sensitivity, and bridge balancing is effected by ring 5 which sets the diaphragm 65. As the diaphragm aperture is varied, the resistance of the cell 27 is also varied so that moving coil instrument 26 can operate to move its indicator 79 into alignment with the zero mark 74.

It will further be apparent to those skilled in the art that the balancing arrangement can be designed as a switching relay with the diaphragm preselector ring 5 being driven by a motor and adjusted, as a result of such driving, until the indicator 79 is aligned with the zero mark 74. Thereby, by depressing the key 8, the diaphragm 65 is automatically adjusted in conformity with the ambient illumination and with the preselected shutter time. Also, the timing ring 81 can be driven by a motor in accordance with a preselected diaphragm setting so that, when key 8 is depressed, a shutter setting is attained and which is in conformity with the ambient illumination and a preselected diaphragm value.

Finally, the moving coil instrument can be designed as a deflection instrument with the deflection indications corresponding to given shutter times since the photocell is influenced, as to its resistance, by the setting of the diaphragm. A preselected shutter time setting can be obtained by stepping devices positioned ahead of the photocell or by means of resistances in the circuit of the latter and coupled with the timing ring. In this latter case, the indicator of the instrument is always positioned at a mark which corresponds to a time-diaphragm combination coordinated with a true exposure value.

While specific embodiments of the invention have been shown and described to illustrate the application of the principles of the invention, it will be understood that the invention may be embodied otherwise without departing from such principles.

What is claimed is:

1. In a single lens reflex camera having an exposure meter including a measuring instrument and a photosensitive cell, with the cell being mounted for movement into and out of the path of light rays entering through the camera objective; a diaphragm; a diaphragm adjuster; a slide mounting said cell for such movement; setting means operatively connected to said adjuster and operable to adjust said diaphragm; and manually actuable means connected both to said slide and to said setting means and effective, when actuated, to operate said setting means to adjust said diaphragm to a position determined by said adjuster and to move said cell into such light ray path, said setting means comprising a lever pivoted, intermediate its ends, about a pivot point adjustable by actuation of said manually actuable means, said lever having one end operatively connected with said diaphragm adjuster; and means operatively connected to the opposite end of said lever, and including a lost motion connection, effective upon movement of said opposite end to adjust said diaphragm; said lever, during operation by said manually actuable means to adjust said diaphragm, pivoting about it operative connection with said diaphragm adjuster.

2. In a single lens reflex camera as claimed in claim 1, said diaphragm adjuster having a cam movable therewith; said one end of said lever having a cam follower engageable with and movable by said cam.

3. In a single lens reflex camera as claimed in claim 2, said means operatively connected to said opposite end of said lever including a longitudinally slidable pin provided with longitudinally spaced abutment means between which said opposite end of said lever extends so that, upon swinging movement of said lever, said pin is moved longitudinally; said pin, after a predetermined longitudinal movement thereof by said lever, adjusting said diaphragm.

4. In a single lens reflex camera as claimed in claim 3, said lost motion connection including a tappet mounted for longitudinal sliding movement in alignment with said pin but normally spaced longitudinally therefrom; said tappet being engaged with said diaphragm whereby, upon said pin engaging said tappet, said diaphragm is moved toward the adjusted position responsive to movement of said pin; means biasing said tappet toward said pin; and means limiting movement of said tappet toward said pin to maintain a predetermined spacing therebetween except when said manually actuable means is actuated.

5. In a single lens reflex camera as claimed in claim 1, means biasing said diaphragm to the fully open position;

said diaphragm adjuster, said lever, and said manually actuable means being so constructed and arranged that said diaphragm adjuster is effective to adjust said diaphragm toward a closed position only when said manually actuable means is maintained actuated; said pivotal mounting for said lever comprising a pivot carried intermediate the ends of a coupling lever having one end pivotally connected to a fixed point of the camera; a shutter release; an operator operatively associated with said shutter release and engageable with the opposite end of said coupling lever, upon operation of the shutter release, to swing said coupling lever to move said pivot to swing said setting means lever to reset said diaphragm to its adjusted position.

6. In a single lens reflex camera as claimed in claim 5, an operating lever pivoted, at one end, to a fixed point in the camera, and having its opposite end operatively connected to said slide; said operating lever being relatively elongated and having, intermediate its ends, a slot formed therein and including two interconnected branches extending at an angle to each other; said manually actuable means including a bell crank lever having a free end carrying a pin engaged in said slot and being pivoted, intermediate its ends, to fixed point in the camera, and further being provided with means in operative relation with said setting means; said pin, upon initial swinging movement of said bell crank lever, moving along a branch of said slot having a relative orientation such that there is no effective movement of said operating lever and entering the other branch of the slot after a predetermined swinging movement of said bell crank lever; said other branch being so oriented that, upon continued swinging movement of said bell crank lever, said operating lever is swung to move said slide to position said cell in such light ray path; said bell crank lever, through its operative association with said setting means, operating the latter, during such initial swinging of said bell crank lever, to operatively connect said diaphragm adjuster to said diaphragm for adjustment of the latter; whereby connection of said adjuster to said diaphragm is completed before movement of said cell into such light ray path is effected.

7. In a single lens reflex camera as claimed in claim 6, an expansible linkage including first and second links pivotally interconnected at adjacent ends; the free end of said first link being pivoted to the camera at a fixed point and the free end of said second link being connected to said pivot for said setting lever means; spring means biasing said expansible linkage to a normally at least partially contracted position, as to effective length; a second pin carried by said bell crank lever inwardly of said first pin and engaged with said expansible linkage; said second pin, upon swinging movement of said bell crank lever, moving said expansible linkage against the force of its biasing means to increase the effective length thereof whereby to move the pivot for said setting lever means in a direction to swing said setting lever means.

8. In a single lens reflex camera as claimed in claim 7, said second pin being engaged with a surface of said first link, and said surface of said first link having a contour such that said expansible linkage is operated in an effective length increasing direction only during such initial swinging of said bell crank lever and remains substantially stationary during the remaining swinging of said bell crank lever.

9. In a single lens reflex camera as claimed in claim 8, said fixed pivotal mounting of said first link including means for adjusting the pivot axis of said first link.

10. In a single lens reflex camera having an exposure meter including a measuring instrument and a photosensitive cell, with the cell being mounted for movement into and out of the path of light rays entering through the camera objective; a diaphragm; a diaphragm adjuster; a slide mounting said cell for such movement; setting means operatively connected to said adjuster and operable to adjust said diaphragm; and manually actuable means connected both to said slide and to said setting means and effective, when actuated, to operate said setting means to adjust said diaphragm to a position determined by said adjuster and to move said cell into such light ray path, an operating lever pivoted, at one end, to a fixed point in the camera, and having its opposite end operatively connected to said slide; said operating lever being relatively elongated and having, intermediate its ends, a slot formed therein and including two interconnected branches extending at an angle to each other; said manually actuable means including a bell crank lever having a free end carrying a pin engaged in said slot and being pivoted, intermediate its ends, to a fixed point in the camera, and further being provided with means in operative relation with said setting means; said pin, upon initial swinging movement of said bell crank lever, moving along a branch of said slot having a relative orientation such that there is no effective movement of said operating lever and entering the other branch of the slot after a predetermined swinging movement of said bell crank lever; said other branch being so oriented that, upon continued swinging movement of said bell crank lever. said operating lever is swung to move said slide to position said cell in such light ray path; said bell crank lever, through its operative association with said setting means, operating the latter, during such initial swinging of said bell crank lever, to operatively connect said diaphragm adjuster to said diaphragm for adjustment of the latter; whereby connection of said adjuster to said diaphragm is completed before movement of said cell into such light ray path is effected.

11. In a single lens reflex camera as claimed in claim 10, the free end of said operating lever being formed with a gear segment concentric with its pivot axis; and a rotatably mounted pinion meshing with said gear segment and operatively connected to said slide.

12. In a single lens reflex camera as claimed in claim 11, said slide being formed with a slot extending substantially perpendicular to its direction of movement; a radius arm secured to rotate with said pinion; and a pin on the free end of said radius arm engaged in said slot, whereby rotation of said pinion effects longitudinal movement of said slide; said moving coil instrument being supported on said slide for movement with said cell; said slide moving said cell into light-receiving relation with the screen of the camera viewfinder, and said moving coil instrument being so positioned that, when said cell is in such light-receiving relation, the indicator of said moving coil instrument is also visible in the viewfinder.

13. In a single lens reflex camera having an exposure meter including a measuring instrument and a photosensitive cell, with the cell being mounted for movement into and out of the path of light rays entering through the camera objective; a diaphragm; a dipahragm adjuster; a slide mounting said cell for such movement; setting means operatively connected to said adjuster and operable to adjust said diaphragm; and manually actuable means connected both to said slide and to said setting means and effective, when actuated, to operate said setting means to adjust said diaphragm to a position determined by said adjuster and to move said cell into such light ray path, said measuring instrument being a balancing instrument and including a center mark associated with its indicator; a rotatable shutter time selecting ring; a voltage dividing resistance included in a balancing bridge circuit further including said measuring instrument; and a contact carried by said shutter time setting ring and engageable with said resistance; whereby a shutter time setting can be obtained, as a function of the light effective on said photosensitive cell, by adjusting said shutter time setting ring to bring the indicator of said measuring instrument into coincidence with said center mark.

14. In a single lens reflex camera as claimed in claim 13, electric drive means for operating said diaphragm adjuster; an energizing circuit for said drive means closed responsive to actuation of said manually actuable means; and switch means included in said movable coil instrument and operable, when the indicator of the latter is aligned with said center mark, to open said energizing circuit.

15. In a single lens reflex camera as claimed in claim 13, electric drive means for said shutter time ring; an energizing circuit for said drive means closed responsive to actuation of said manually actuable means; said measuring instrument including switch means operable, responsive to coincidence between the indicator of said measuring instrument and said center mark, to open said energizing circuit so that the shutter time is set automatically in coordination with the prevailing light conditions and the preselected diaphragm aperture.

References Cited by the Examiner
UNITED STATES PATENTS

| | | | |
|---|---|---|---|
| 2,754,735 | 7/1956 | Meyer | 95—10 |
| 2,784,654 | 3/1957 | Meyer | 95—10 |
| 2,937,582 | 5/1960 | Goshima | 95—10 |

NORTON ANSHER, *Primary Examiner.*

D. B. LOWE, *Examiner.*

J. R. BLOOM, *Assistant Examiner.*